United States Patent
Lee et al.

(10) Patent No.: US 6,611,814 B1
(45) Date of Patent: Aug. 26, 2003

(54) SYSTEM AND METHOD FOR USING VIRTUAL WISH LISTS FOR ASSISTING SHOPPING OVER COMPUTER NETWORKS

(75) Inventors: Juhnyoung Lee, Yorktown Heights, NY (US); Jayant R. Kalagnanam, Tarrytown, NY (US); Andrew J. Davenport, Ossining, NY (US); Ho Soo Lee, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 09/618,100

(22) Filed: Jul. 17, 2000

(51) Int. Cl.[7] .............................................. G06F 17/60
(52) U.S. Cl. ......................................... 705/26; 705/27
(58) Field of Search ...................................... 705/26, 27

(56) References Cited

U.S. PATENT DOCUMENTS

| | | | | |
|---|---|---|---|---|
| 4,866,661 A | * | 9/1989 | de Prins ...................... 235/375 |
| 5,113,496 A | * | 5/1992 | McCalley et al. ........... 340/2.1 |
| 5,201,010 A | * | 4/1993 | Deaton et al. ............... 382/139 |
| 5,717,923 A | * | 2/1998 | Dedrick ........................ 705/10 |
| 5,754,981 A | * | 5/1998 | Veeneman et al. ............ 705/26 |
| 5,761,648 A | * | 6/1998 | Golden et al. ................ 705/10 |
| 5,774,874 A | * | 6/1998 | Veeneman et al. ............ 705/14 |
| 5,898,594 A | * | 4/1999 | Leason et al. ............... 700/225 |
| 5,951,642 A | * | 9/1999 | Onoe et al. .................. 709/224 |
| 5,970,474 A | * | 10/1999 | LeRoy et al. ................. 705/27 |
| 6,041,311 A | * | 3/2000 | Chislenko et al. ............ 705/27 |
| 6,125,353 A | * | 9/2000 | Yagasaki ...................... 705/27 |
| 6,282,567 B1 | * | 8/2001 | Finch et al. .................. 707/10 |
| 6,295,530 B1 | * | 9/2001 | Ritchie et al. ................ 705/10 |
| 6,317,761 B1 | * | 11/2001 | Landsman et al. ............ 705/27 |
| 6,356,898 B2 | * | 3/2002 | Cohen et al. ................. 707/10 |
| 6,490,602 B1 | * | 12/2002 | Kraemer ...................... 707/513 |
| 2001/0054009 A1 | * | 12/2001 | Miller et al. .................. 705/26 |
| 2002/0072974 A1 | * | 6/2002 | Pugliese, III et al. ......... 705/14 |
| 2002/0085025 A1 | * | 7/2002 | Busis et al. ................. 345/738 |

FOREIGN PATENT DOCUMENTS

JP          11-306243 A       * 11/1999

OTHER PUBLICATIONS

Dudrow, A, "Electronic–Commerce Upsurge Predicted," eMediaweekly, vol. 13, No. 1, Oct. 26, 1998.*
Anon., "New Web Site Allow children to Spend Online," Newbytes, Jan. 26, 1999.*
Anon., "ASC (Applications Systems Corp.)," Jewelers' Circular–Keystone, p. 302, Jun. 1999.*
Buchanan, L., "Web Wars Heating up," HFN, vol. 73, No. 36, p. 25+, Jun. 28, 1999.*
Mardesich, J., "The Web Is no Shopper's Paradise," Furtune, vol. 14, No. 9, pp. 188–198, Nov. 8, 1999.*

* cited by examiner

Primary Examiner—Nicholas David Rosen
(74) Attorney, Agent, or Firm—Whitham, Curtis, & Christofferson, P.C.; Stephen C. Kaufman

(57) ABSTRACT

A computer system and method uses one or more virtual wish lists of one or more shoppers over a computer network. One process extracts information from online address books or other personal databases, and creates lists of recipients for whom a shopper wants to purchase products. A second process obtains virtual wish lists of recipients by observing their visits to online stores, and other online behavior. Recipients are asked for permission to make this data available to other shoppers, online stores, and other Web sites. Recipients can modify their virtual wish lists, and selectively approve of their use by other shoppers, etc. A third process creates shopping lists for the recipients, and generates lists of recommended products for shoppers to buy for intended recipients.

15 Claims, 17 Drawing Sheets

| | /1001 | /1002 | /1003 | /1004 | /1005 | /1006 | /1007 |
|---|---|---|---|---|---|---|---|
| PRODUCT | PRODUCT ID | STORE | FIRST TIMESTAMP | LAST TIMESTAMP | # VISITS | INTEREST LEVEL |
| P16 | U74283 | S1 | 3-21-00 | 3-21-00 | 1 | 2 |
| P17 | U3819 | S1 | 3-21-00 | 3-21-00 | 1 | 1 |
| P18 | U21921 | S1 | 2-8-00 | 3-21-00 | 2 | 3 |
| P19 | U9402 | S2 | 1-31-00 | 3-21-00 | 2 | 1 |
| P20 | U8742 | S2 | 3-21-00 | 3-21-00 | 1 | 2 |
| P21 | U3526 | S3 | 3-27-00 | 3-27-00 | 1 | 2 |
| P22 | U112941 | S3 | 3-27-00 | 3-27-00 | 1 | 1 |
| P23 | U4902 | S3 | 1-13-00 | 3-27-00 | 2 | 2 |
| P24 | U4292 | S3 | 12-20-99 | 3-27-00 | 3 | 3 |
| P25 | U3428 | S4 | 4-3-00 | 4-3-00 | 1 | 1 |
| P26 | U23892 | S4 | 4-3-00 | 4-3-00 | 1 | 1 |
| P27 | U0942 | S4 | 2-25-00 | 4-3-00 | 3 | 3 |
| P28 | U29320 | S4 | 4-3-00 | 4-3-00 | 1 | 1 |
| P29 | U0131 | S4 | 4-3-00 | 4-3-00 | 1 | 2 |
| P30 | U18298 | S1 | 3-20-00 | 4-12-00 | 2 | 2 |
| P31 | U6217 | S1 | 3-20-00 | 4-12-00 | 2 | 2 |
| P32 | U4820 | S1 | 4-3-00 | 4-12-00 | 1 | 1 |

FIG. 10

| RECIPIENT | SHOPPING CONSTRAINTS | | | PRODUCT | PRODUCT DATA | |
|---|---|---|---|---|---|---|
| | BUDGET | SIZE | COLOR | | PRODUCT ID | INTEREST LEVEL |
| JOE SMITH | $30 | M | GREEN | P21 | U9821 | 3 |
| JOE SMITH | $30 | M | BLACK | P42 | U901 | 2 |
| JOE SMITH | $30 | M | BLACK | P632 | U6213 | 1 |
| NAME TWO | $40 | S | RED | P321 | U51231 | 2 |
| NAME TWO | $40 | S | RED | P213 | U6211 | 2 |
| NAME THREE | $30 | L | YELLOW | P311 | U2131 | 3 |
| NAME THREE | $30 | L | WHITE | P12 | U5241 | 1 |
| NAME THREE | $30 | L | BLACK | P27 | U371 | 1 |

FIG. 11

| RECIPIENT | PRICE | SIZE | COLOR | PRODUCT | PRODUCT ID | INTEREST LEVEL | MERCHANDISING DATA |
|---|---|---|---|---|---|---|---|
| JOE SMITH | $25 | M | BLACK | P42 | U901 | 2 | |
| JOE SMITH | $29 | M | GARY | P21 | U8411 | N/A | SUBSTITUTION |
| NAME TWO | $33 | S | RED | P321 | U51231 | 2 | |
| NAME TWO | $5 | S | RED | P12 | U132 | N/A | ACCESSORY |
| NAME THREE | $29 | L | YELLOW | P311 | U2131 | 3 | |
| NAME THREE | $25 | L | WHITE | P12 | U5241 | 1 | |

FIG. 12

| 1301 | 1302 | 1303 | 1304 | 1305 | 1306 | 1307 | 1308 |
|---|---|---|---|---|---|---|---|
| PRODUCT | PRODUCT ID | CROSS-SELL | UP-SELL | ACCESSORY | SUBSTITUTION | PROMOTION | INVENTORY LEVEL |
| P312 | U3728 | P212 | P567 |  | P123 | YES | 3 |
| P313 | U631 | P212 |  | P24, P31 | P782 |  | 3 |
| P314 | U8931 | P67 | P638 | P56, P87 | P328, P218 |  | 2 |
| P315 | U821 | P785 | P865 | P23 |  |  | 2 |
| P316 | U892 | P868 |  |  | P321 |  | 3 |
| P317 | U5162 | P765 | P244 |  |  | YES | 1 |
| P318 | U3127 | P657 | P757 | P56, P68 | P378, P456 |  | 2 |
| P319 | U431 | P785 | P657 | P97, P87 | P122 |  | 2 |
| P320 | U3718 | P437 |  |  | P212 |  | 2 |
| P321 | U128 | P665 | P678 |  |  | YES | 2 |
| P322 | U9421 | P865 |  | P12, P3, P7 | P218 | YES | 1 |
| P323 | U123 | P344 | P232 | P45, P8 | P832 |  | 1 |
| P324 | U718 | P334 | P345 | P887 |  |  | 3 |
| P325 | U584 | P764 |  |  | P171 |  | 2 |
| P326 | U472 | P234 |  |  |  |  | 2 |

FIG. 13

|  | 1501 | 1502 | 1503 | 1504 | 1505 |
|---|---|---|---|---|---|
|  | COOKIE | PRODUCT | PRODUCT ID | STORE | TIMESTAMP |
| 1506— | C1 | P31 | U74283 | SX | T1 |
|  | C1 | P14 | U3819 | SX | T2 |
|  | C2 | P18 | U21921 | SY | T3 |
|  | C2 | P83 | U9402 | SY | T4 |
|  | C2 | P20 | U8742 | SY | T5 |
|  | C3 | P44 | U3526 | SZ | T6 |
|  | C1 | P24 | U12941 | SW | T7 |
|  | C3 | P21 | U4902 | SZ | T8 |
|  | C3 | P43 | U4292 | SZ | T9 |
|  | C2 | P12 | U3428 | SU | T10 |
|  | C2 | P42 | U23892 | SU | T11 |
|  | C1 | P43 | U0942 | SW | T12 |
|  | C1 | P67 | U29320 | SW | T13 |
|  | C4 | P21 | U0131 | SV | T14 |
|  | C4 | P45 | U18298 | SV | T15 |
|  | C3 | P53 | U6217 | SZ | T16 |
|  | C3 | P24 | U4820 | SZ | T17 |

| COOKIE | PRODUCT | PRODUCT ID | STORE | TIMESTAMP |
|---|---|---|---|---|
| C1 | P31 | U74283 | SX | T1 |
| C1 | P14 | U3819 | SX | T2 |
| C1 | P24 | U12941 | SW | T7 |
| C1 | P43 | U0942 | SW | T12 |
| C1 | P67 | U29320 | SW | T13 |

1602

| COOKIE | PRODUCT | PRODUCT ID | STORE | TIMESTAMP |
|---|---|---|---|---|
| C2 | P18 | U21921 | SY | T3 |
| C2 | P83 | U9402 | SY | T4 |
| C2 | P20 | U8742 | SY | T5 |
| C2 | P12 | U3428 | SU | T10 |
| C2 | P42 | U23892 | SU | T11 |

1603

| COOKIE | PRODUCT | PRODUCT ID | STORE | TIMESTAMP |
|---|---|---|---|---|
| C3 | P44 | U3526 | SZ | T6 |
| C3 | P21 | U4902 | SZ | T8 |
| C3 | P43 | U4292 | SZ | T9 |
| C3 | P53 | U6217 | SZ | T16 |
| C3 | P24 | U4820 | SZ | T17 |

1604

| COOKIE | PRODUCT | PRODUCT ID | STORE | TIMESTAMP |
|---|---|---|---|---|
| C4 | P21 | U0131 | SV | T14 |
| C4 | P45 | U18298 | SV | T15 |

FIG. 16

SYSTEM AND METHOD FOR USING VIRTUAL WISH LISTS FOR ASSISTING SHOPPING OVER COMPUTER NETWORKS

CROSS REFERENCE TO RELATED APPLICATION

This application is related in subject matter to U.S. patent application Ser. No. 09/617,496 filed concurrently herewith by Jayant R. Kalagnanam, Ying Tat Leung, Andrew James Davenport, and Juhnyoung Lee for "Electronic Shopping Assistant" and Ser. No. 09/618,096 filed concurrently herewith by Juhnyoung Lee, Jayant R. Kalagnanam, Andrew James Davenport, and Ho Soo Lee for "System and Method for Generating Virtual Wish Lists for Assisting Shopping over Computer Networks", both of which are assigned to a common assignee herewith. The disclosure of Applications Ser. No. 09/617,496 and Ser. No. 09/618,096 are incorporated herein by reference.

DESCRIPTION

BACKGROUND OF THE INVENTION

1. Field of the Invention

The present invention generally relates to shopping over a computer network and, more particularly, to shopping over the Internet where shoppers purchase products for other people and online stores recommend one or more products that match with needs and tastes of the recipients by collecting and analyzing data about the recipients' navigation of online stores and other Web sites in the Internet.

2. Background Description

Commerce over networks, particularly e-commerce over the Internet, has increased significantly over the past few years. Part of e-commerce enables users/customers to access information of products and to purchase them from various commercial Web sites (i.e., online stores). There are numerous online stores currently operating in the Internet including. Amazon.com, eToys.com, Buy.com, Wal-Mart.com, LLBean.com, and Macys.com. These online stores provide various customer services to make commerce activities possible and easier over Web sites. Some of the examples of the basic services are catalogs of merchandise which are both browsable and searchable by various product attributes (e.g., keyword, name, manufacturer, and model number), online shopping carts, and checkout process. Some online stores also provide advanced customer services such as wish lists, gift registries, calendars, custom-configuration of products, buyer's groups, chatting, e-mail notification, and in-context sales.

A wish list is a shopping tool available in a number of online stores including Amazon.com, EddieBauer.com and Sears.com. A shopper can create a wish list in an online store and record information on products he or she wants to buy from the store in the list. The store keeps the product information for a definite period of time, e.g., a year. The shopper can access the list anytime and make one or more transactions for purchasing one or more products stored in the list. Some online stores such as Amazon.com extend their online shopping cart service to provide the wish list capability to some degree. However, such shopping carts store the product information for a shorter period of time, e.g., ninety days. A wish list helps its user purchase a bundle of products at a time from an online store. Also, a wish list helps other people such as friends and family of its user purchase one or more products that match with needs and tastes of the wish list user by referring to information stored in the wish list, as seen in Macys.com's Bridal Registry program which is a variation of a wish list service.

This invention presents a new shopping tool called a virtual wish list that overcomes several limitations in using (actual) wish lists, and extends the prior art's functions in a significant way. Unlike actual wish lists, the virtual wish list tool does not require the users to register to online stores for the service. Also, it does not require the users to add products to buy to their wish lists. In addition, it does not limit the product selection to ones that are sold or provided in one particular online store. Instead, it automatically creates and maintains information of products the users are interested in by observing shoppers's visits to product Web pages in different online stores. Furthermore, the tool can help shopping for multiple products and multiple people at a time and selecting a list of products optimized for various constraints such as budget and product preferences. This invention describes how such virtual wish lists of shoppers can be created and used.

3. Problems with the Prior Art

A wish list service of the prior art requires the users to register to the online store that provides the service. Registration to an online store is often tedious and error-prone process. Furthermore, if a user wants to maintain multiple wish lists in different online stores, the person needs to register multiple times to those online stores.

A wish list service of the prior art requires the users to add one or more products they wish to buy to the list. If a shopper does not actually add a product to his or her wish list, the shopper does not have a record of the product in his or her wish list, even though he or she is interested in buying this particular product.

A wish list service of the prior art limits the selection of products that can be added to the wish lists to ones sold or provided in the online store that provides the service. This limitation on product selection sometimes enforces shoppers to create multiple wish lists in different online stores. For example, a shopper may need a wish list for books, and another wish list for shoes. Maintaining multiple wish lists is often difficult and tedious task for online shoppers. The requirement of multiple store registration adds more difficulty to the task.

A wish list service of the prior art does not help select a list of products optimized for various constraints such as budget and product preferences. In fact, a wish list service of the prior art does not even allow to specify any constraint regarding shopping at all.

SUMMARY OF THE INVENTION

It is therefore an object of the present invention to provide an improved system and method for shopping for products over a network.

An object of this invention is to provide an improved system and method for shopping for products over a network that provides virtual wish lists while not requiring the users to register to online stores for using the service.

A further object of this invention is to provide an improved system and method for shopping for products over a network that provides virtual wish lists while not requiring the users to register to online stores for using the service, and not requiring the users to add products to buy to their wish lists.

Yet another object of this invention is to provide an improved system and method for shopping for products over a network that provides virtual wish lists while not requiring the users to register to online stores for using the service, not requiring the users to add products to buy to their wish lists, and not limiting the product selection to ones that are sold or provided in one particular online store.

Another object of this invention is to provide an improved system and method for shopping for products over a network that provides virtual wish lists while not requiring the users to register to online stores for using the service, not requiring the users to add products to buy to their wish lists, not limiting the product selection to ones that are sold or provided in one particular online store, and at the same time, automatically creating and maintaining information of products the users are interested in.

Still another object of this invention is to provide an improved system and method for shopping for products over a network that provides virtual wish lists while not requiring the users to register to online stores for using the service, not requiring the users to add products to buy to their wish lists, not limiting the product selection to ones that are sold or provided in one particular online store, and at the same time, automatically creating and maintaining information of products the users are interested in a single wish list, not multiple wish lists.

Yet a further object of this invention is to provide an improved system and method for shopping for products over a network that provides virtual wish lists while not requiring the users to register to online stores for using the service, not requiring the users to add products to buy to their wish lists, not limiting the product selection to ones that are sold or provided in one particular online store, at the same time, automatically creating and maintaining information of products the users are interested in a single wish list, not multiple wish lists, and helping shopping for multiple products and multiple people whose virtual wish lists are available.

Another object of this invention is to provide an improved system and method for shopping for products over a network that provides virtual wish lists while not requiring the users to register to online stores for using the service, not requiring the users to add products to buy to their wish lists, not limiting the product selection to ones that are sold or provided in one particular online store, at the same time, automatically creating and maintaining information of products the users are interested in a single wish list, not multiple wish lists, helping shopping for multiple products and multiple people whose virtual wish lists are available, and helping selecting a list of products optimized for various constraints such as budget and product preferences.

According to the invention, there is provided a computer system for using one or more virtual wish lists of one or more shoppers over one or more networks. The system comprises one or more central processing units (CPUs), one or more memories, and one or more network interfaces to one or more networks. One or more recipient list generating processes extract information about one or more people from one or more online address books and/or other personal database systems, and create one or more lists of people for whom the shopper wants to purchase one or more products. One or more recipient list updating processes receive one or more recipient lists from one or more shoppers, and modify them if necessary to reflect data stored in one or more actual wish lists, and/or to reflect merchandising efforts of one or more online store. One or more shopping list generating processes receive one or more virtual wish lists of one or more product recipients, and create one or more shopping lists for the product recipients. One or more virtual wish list retrieval processes receive one or more product recipient lists from one or more shoppers or one or more online stores, and retrieve and search for virtual wish lists for the product recipients from one or more databases. One or more recommended product list generating processes receive one or more recipient lists, one or more virtual wish lists, and one or more shopping lists from one or more shoppers, one or more online stores, and one or more virtual wish list retrieval processes, and create one or more recommended product lists. One or more virtual list use approval request processes ask a shopper of the use of the shopper's virtual wish list by other shoppers, one or more online stores, and one or more other Web sites. One or more virtual list use approval processes allows the owner of a virtual wish list to modify the virtual wish list if necessary and to selectively approve the use of the virtual wish list by other shoppers, one or more online stores, and one or more other Web sites.

The invention also provides a method for using virtual wish lists over a computer network. One or more recipient lists are created from one or more online address books and/or personal databases. One or more recipient lists are sent to one or more online stores and/or other Web sites over one or more computer network interfaces. One or more recipient lists are updated, if necessary, to reflect data stored in one or more actual wish lists and/or to reflect the merchandising efforts of one or more online stores. One or more owners of virtual wish lists are asked if they approve the use of their virtual wish lists by one or more other shoppers, online stores, and other Web sites. One or more approvals and disapprovals are received from the virtual wish lists owners on the use of their virtual wish lists. Virtual wish lists for one or more recipients specified in one or more recipient lists are retrieved and/or searched for. One or more shopping lists are created by merging one or more recipient lists and one or more virtual wish lists retrieved for the recipient lists. One or more shopping lists are received over one or more computer network interfaces. One or more lists of recommended products are created for one or more received shopping lists. One or more recommended products are placed into one or more online shopping carts. One or more transactions are completed for recommended products.

BRIEF DESCRIPTION OF THE DRAWINGS

The foregoing and other objects, aspects and advantages will be better understood from the following detailed description of a preferred embodiment of the invention with reference to the drawings, in which:

FIG. 10 is a block diagram showing shopper navigation data;

FIG. 11 is a block diagram showing a shopping list;

FIG. 12 is a block diagram showing a recommended product list;

FIG. 13 is a block diagram showing merchandising data;

FIG. 15 is a block diagram showing a Web log;

FIG. 16 is a block diagram showing a Web log grouped by shopper; and

DETAILED DESCRIPTION OF A PREFERRED EMBODIMENT OF THE INVENTION

The system and method for generating virtual wish lists is described and claimed in Application Ser. No. 09/618,096 entitled "System and Method for Generating Virtual Wish Lists for Assisting Shopping Over Computer Networks", and illustrated in FIGS. 5, 6 and 14 to 17. The preferred embodiment of the system and method for using virtual wish lists according to the present invention described herein and illustrated in FIGS. 1 to 4 and 7 to 13.

Figure 1:
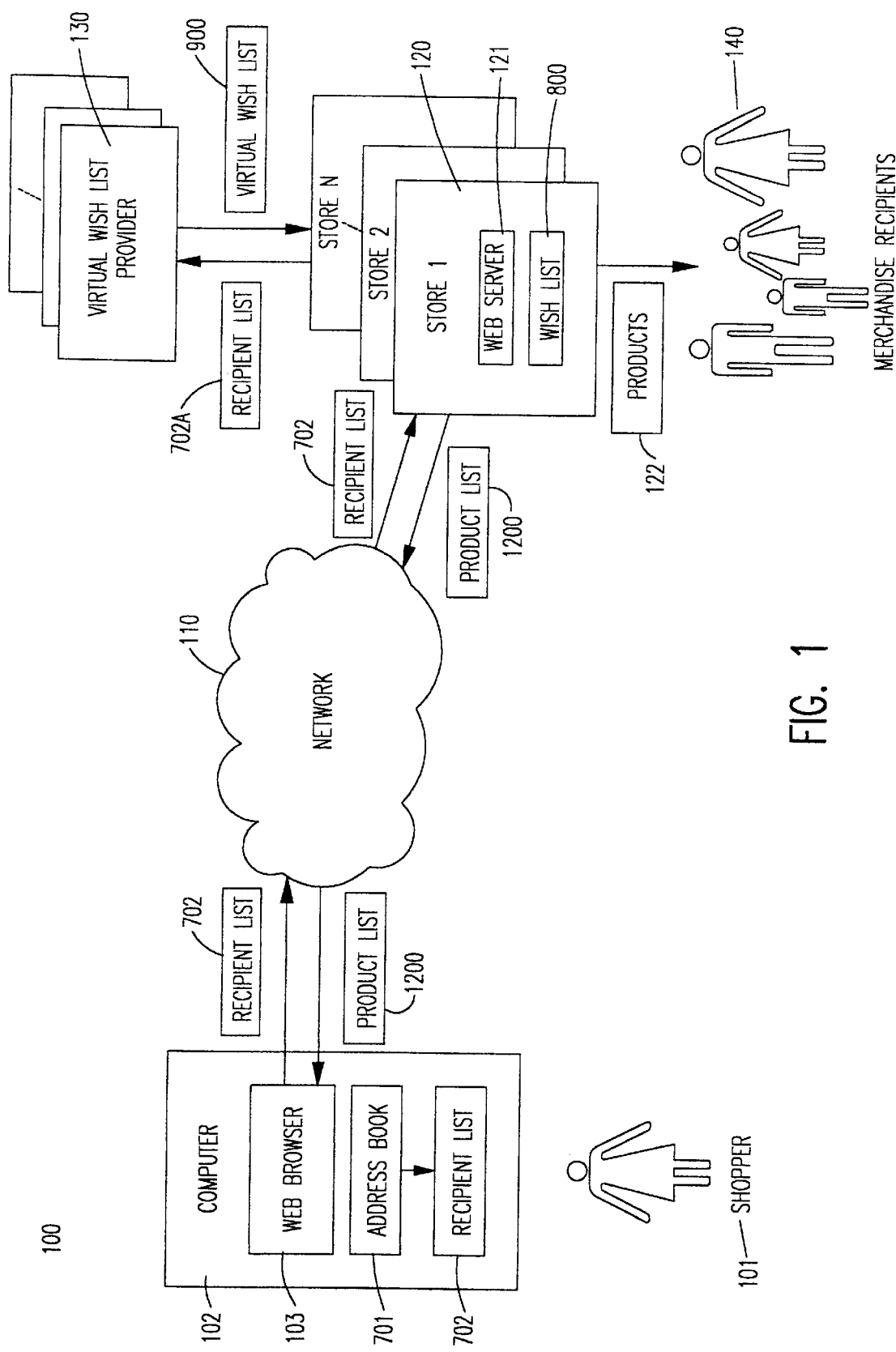
FIG. 1 is a block diagram of one preferred system architecture for using virtual wish lists.

Referring now to the drawings, and more particularly to FIG. 1, there is shown a block diagram of one preferred system architecture for using virtual wish lists, showing one or more shoppers 101, one or more computers 102 used by the shoppers, one or more Web browser programs 103 used by the shoppers, one or more online address books 701, one or more recipient lists 702, a computer network 110, one or more online stores 120 in the network, one or more Web server programs 121 used by the online stores, one or more actual wish lists 800 (shown in more detail in FIG. 8) used by the online stores, one or more virtual wish lists 900 (shown in more detail in FIG. 9), one or more virtual wish list providers 130, one or more recommended product lists 1200 (shown in more detail in FIG. 12, one or more product recipients 140, and one or more products sent to the recipients 122.

When a shopper 101 intends to purchase and/or receive information of one or more products by using a computer network 110 such as the Internet, he or she starts a Web browser program 103 in his or her computer 102 and visits one or more online stores 120 in the network 110 which sell the products of interest. Individual online stores 120 are implemented with a Web server system 121 which receives Web page requests from shoppers 101 and sends out requested Web pages back to the shoppers 101. For this communication, Web browser programs 103 and Web server systems 121 typically use HTTP (HyperText Transfer Protocol) which is a network protocol defined for this purpose and used in the Internet.

When a shopper 101 intends to purchase and/or receive information of one or more products from an online store 120 over a computer network 110, he or she accesses the online store 120 from his or her Web browser program 103 and requests one or more Web pages that describe one or more products provided by the online store. To request Web pages describing products, the shopper 101 uses one or more methods the online store 120 provides for finding product information (called shopping metaphors) including hierarchical browsing by following hyperlinks, a keyword-based product search, a parametric search, and a build-to-order product configuration. When receiving a Web page request from a shopper 101, the Web server 121 of the online store 120 generates the Web page and sends it to the shopper. The shopper 101 examines information shown in the received product Web page, and continue his or her shopping, i.e., requesting one or more Web pages describing products, placing one or more products in his or her online shopping cart, moving to the checkout process, and/or leaving the online store.

Some online stores 120 provide various services for shoppers who intends to purchase one or more products for one or more other people. Wish lists 800 is one example of such services. A user can visit an online store which provides a wish list service, register for the wish list service, and add one or more products supplied by the store to his or her wish list. The user allows others who are interested to know how to access his or her wish List in the online store 120. If a shopper wants to purchase one or more products (e.g., as gifts) for the wish list owner, he or she can visit the online store 120, access the wish list, and purchase one or more products in the wish list 800 for the owner.

The invention presents virtual wish lists 900 that assist the users 101 to purchase products 122 which match with tastes and/or needs of receivers 140 of the products. Unlike the actual wish list 800 described above, the virtual wish list 900 does not require the owner to register to a particular online store. A virtual wish List 900 is automatically created, and it keeps information of products its owner is interested in by using the information collected from Web pages the person requests and examines in the Internet. Even when no actual wish list 800 exists for a online shopper, a virtual wish list for the shopper can be created and used. Also, unlike the actual wish list 800, products recorded in the virtual wish list 800 is not limited to ones sold/provided in one particular online store. There can be multiple actual wish lists 800 for an online shopper, one for each different online store the shopper visits, for example, one wish list for an online book store and another List for a shoes store. However, the content of multiple actual wish lists of a shopper can be merged into one virtual wish list 900 which provides information about products its owner is interested in buying along with stores where the products are sold.

A user 101 of virtual wish lists 900 first creates a recipient list 702 in one way or another, e.g., from his or her online address book 701. The user 101 sends out the recipient list 702 to an online store 120 of his or her choice. If the online store 120 finds an actual wish list 800 of one or more persons in the recipient list 702, then it uses the List 800 for selecting one or more products for the person. In any case, the store 120 can request one or more virtual wish lists 900 of one or more persons in the recipient list 702 to the virtual wish list provider 130. When receiving the virtual wish lists 900, the store creates a product list 1200 that matches with the recipient list 702 and sends it back to the user 101. The user 101 examines the product list 1200 and completes one or more transactions if desired. For the transactions completed by the user 101, the store 120 sends out one or more of the purchased products 122 to one or more recipients 140.

If the virtual wish list 900 recommends one or more products that the store 120 does not sell or provide, the store can either recommend one or more products which are substitutable for the original products in the virtual wish list 900, or suggest one or more stores which sell or provide the products, so that the user can visit the suggested stores for completing-the transaction. Another possibility is to have a portal Web site for shopping using virtual wish lists. In this setup, users 101 visit the portal Web site for, say, gift shopping. This portal Web site provides the shoppers 101 with virtual wish lists 900 (by using the service of virtual wish list providers 130) and product information (i.e., product list 1200) with store links, while not directly providing the checkout process for transaction completion. Shoppers 101 visit stores by following the links provided by the portal Web site for completing transactions.

Figure 2:
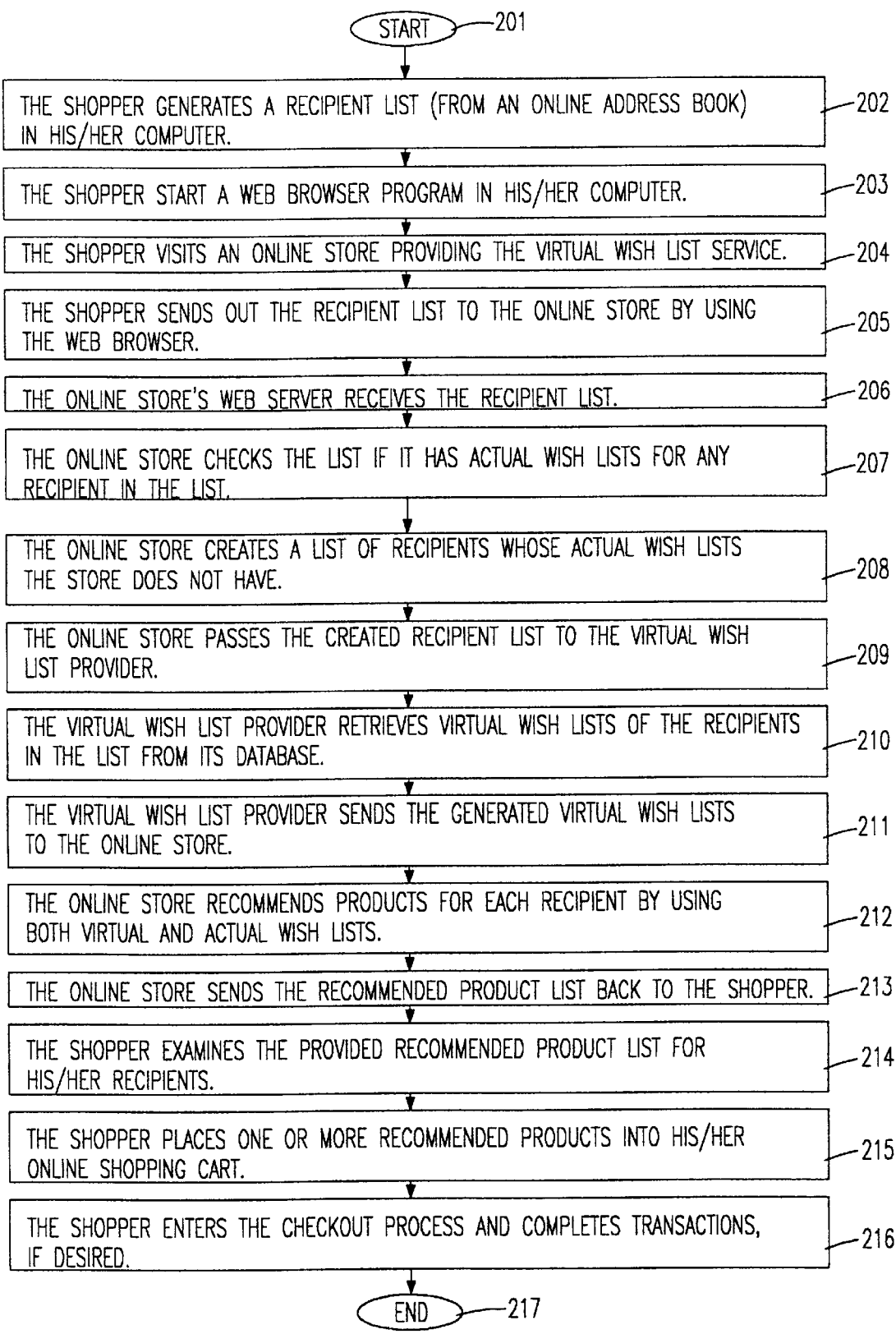
FIG. 2 is a flow chart of a preferred business process for using virtual wish lists.

FIG. 2 is a flow chart of a preferred business process for using virtual wish lists. The first step 202 of this process is that the user 101 makes a list 702 of one or more recipients 140 of products. There are many different ways to create this list 702. The user 101 can manually create it by referring to one or more of his or her paper address books. Alternatively, the user 101 can create the list 702 by using one or more of his or her online address books 701 or personal databases on his or her computer or handheld devices. Also, the user 101 can use both online and paper address books at the same time to create recipient lists 702. When using online address books, the user 101 may use a certain software program that helps generating recipient lists 702 by guiding the user 101 in making selections and automatically retrieving relevant data from one or more online address books 701. Alternatively, the user can use an editor program and cut-and-paste data from address books to create a recipient list 701.

Once the user 101 is ready to shop for recipients in the list 702, the next step 203 is that he or she starts a Web browser program 103 in his or her computer 102. Then, he or she visits an online store 120 (or a shopping portal Web site) which provides a virtual wish list service in step 204. Next, in step 205, the user 101 sends out the prepared recipient list 702 to the online store 120 by using the Web browser program 103 and the network 110. In this step 205, the user 101 may need to modify the prepared recipient list 702 to comply the form required by the online store 120. Also, the user may add to the recipient list 702 certain criteria for selecting information to be included in product recommendation 1200 such as time period of interest one or more product categories of interest, one or more stores of interest, and price range of interest.

When the online store 120 receives the recipient list 702 from the user 101 by using its Web server 121 and the network 110, first, in step 207, the store may check the list 702 to see if it has one or more actual wish lists 800 for one or more recipients in the List. If the store 120 has some, it may not need to request virtual wish lists for the recipients, because the store has data necessary to make product recommendation for the recipients. Alternatively, the store 120 may include even those recipients in the virtual wish list request to broaden the range of recommendation. Based on its policy regarding this matter, the store 120 creates a recipient list 702A for requesting virtual wish lists in step 208, and passes it to one or more virtual wish list providers in step 209. At this point, the store may add to the recipient list 702A certain criteria for selecting information to be included in virtual wish lists 900 such as time period of interest, one or more product categories of interest, one or more stores of interest, and price range of interest. Also, if the store 120 requests virtual wish lists from more than one virtual wish list provider 130, it may send either the whole recipient list or a partial list to each virtual wish list provider 130. For partial lists, the store 120 needs to decide how to map recipients and virtual wish list providers 130.

When a virtual wish list provider 130 receives the recipient list 702A from the online store 120, it retrieves virtual wish lists 900 from its database for the recipients in the list 702A. Depending on the data structure and data retrieval methods, the retrieval and/or search of virtual wish lists from database may take many different forms. Also, various information selection criteria added by the user 101 and the online store 120 to the recipient list 702 and 702A will be taken into account in this data retrieval and/or search process both before and after the retrieval and/or search in step 210. The virtual wish lists retrieved from database may need to be adjusted for these criteria. Then, in step 211, the virtual wish list provider 130 sends the generated virtual wish lists 900 to the requesting online store 120.

When the online store 120 receives virtual wish lists 900 from all the providers 130 it sent the requests (i.e., recipient lists 702 and 702A) to, it prepares a list of product recommendations 1200 for recipients in step 212. If the store 120 receives more than one virtual wish lists 900 for a recipient from one or more virtual wish list provider 130, it need to aggregate the lists into one. Also, if the store 120 has both actual and virtual wish lists for a recipient, it needs to merge them. If the store 120 receives no virtual wish list for a recipient, it may need to recommend products for the recipient by using some other way.

Alternatively, the store 120 may notify the user 101 that there is no information available for the recipient. Also, when the store 120 makes a recommended product lists for recipients, it can add to the list auxiliary product information for cross-sell which markets one or more products complementary in function to a selected product, up-sell which markets one or more products similar but more upscale than a selected product, accessory which markets one or more products accessorizing a selected product, substitution which markets one or more products substituting a selected product, and promotion which markets one or more products for liquidation or testing. When the recommended product list 1200 is prepared, the store 120 sends it to the user in step 213.

When the user 101 receives the product list 1200 of recommended products for his or her recipients 140, he or she examines the recommended products in step 214, places one or more recommended products into his or her online shopping cart in step 215, enters the check-out process and completes transactions, if desired, in step 216. If the online store 120 does not sell one or more recommended products, or if it is a portal Web site that provide the virtual wish list service, the product list win provides one or more links to stores which sell the product. The user 101 can access the store by using the fink, and completes necessary steps for purchase.

Figure 3:
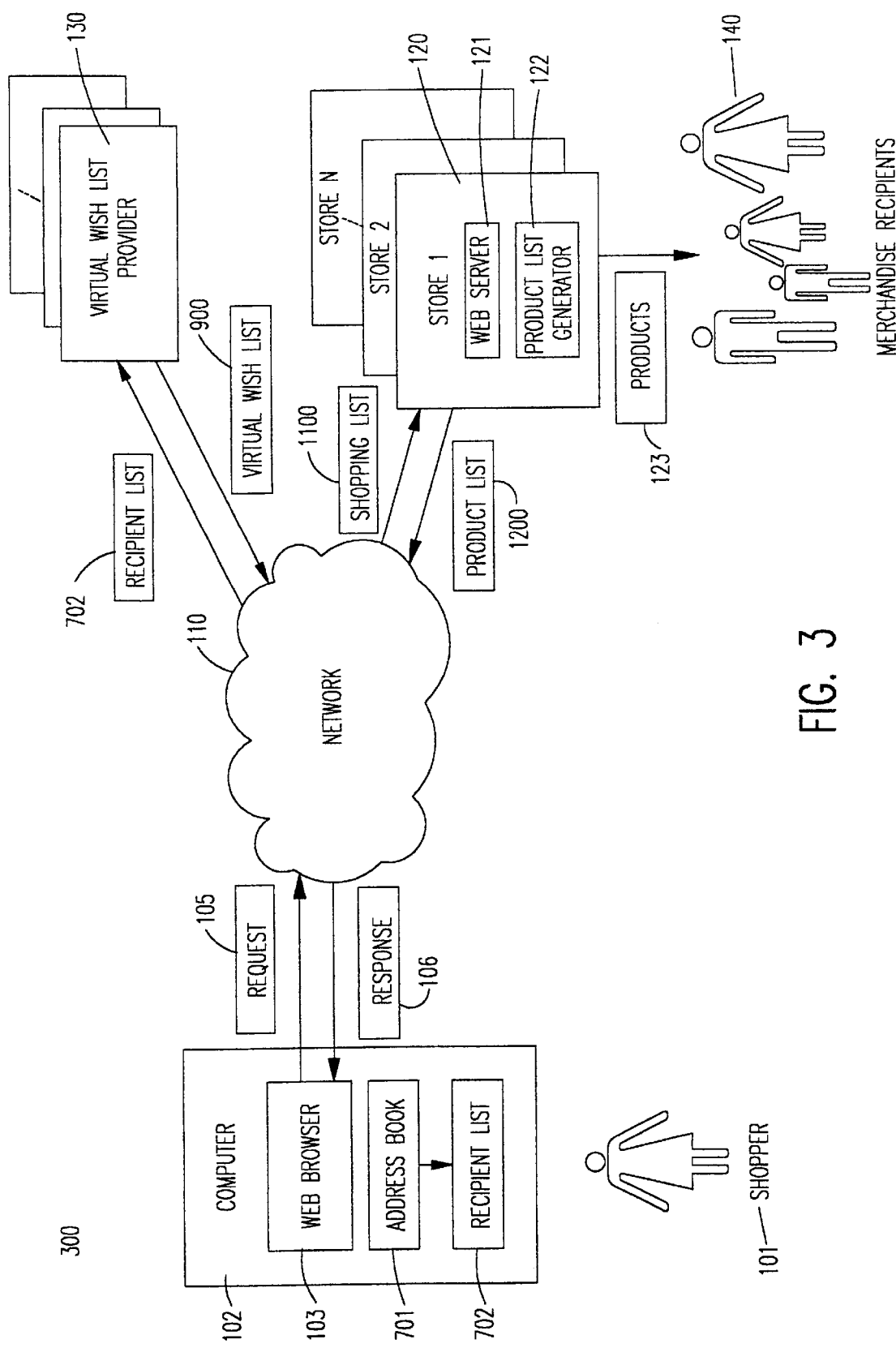
FIG. 3 is a block diagram of another preferred system architecture for using virtual wish lists.

FIG. 3 is a block diagram of another preferred system architecture for using virtual wish lists showing one or more shoppers 101, one or more computers 102 used by the shoppers, one or more Web browser programs 103 used by the shoppers, one or more online address books 701, one or more recipient lists 702, one or more requests 105, one or more responses 106, a computer network 110, one or more online stores 120 in the network, one or more Web server programs 121 used by the online stores, one or more product list generator 122 used by the online store, one or more virtual wish lists 900, one or more virtual wish list providers 130, one or more shopping list 1100, one or more recommended product list 1200, one or more product recipients 140, and one or more products sent to the recipients 123.

The system architecture depicted in FIG. 3 is similar to the system architecture shown in FIG. 1. One difference is that in this architecture, users 101 can directly request virtual wish lists 900 from one or more providers 130 instead of going through online stores or shopping portal Web sites for virtual wish list services. This architecture assumes that the virtual wish list providers 130 are connected to the network 110 by using Web protocols. Another difference is that this architecture assumes online stores to use the product list generator program 122 which was presented and claimed in U.S. patent application Ser. No. 09/617,496 entitled "Electronic Shopping Assistant". The intention is to illustrate how the present invention of virtual wish lists can be used together with the invention of product list generator. The product list generator program 122 receives as input one or more shopping lists that include a number of products to shop along with various constraints in terms of budget, individual price, inter-product relationship, and so on, and generates as output a list of recommended products that satisfies the given constraints. With these two major differences, requests 105 sent out by the users 101 can be recipient lists 702 (going to the virtual wish list providers 130) or shopping lists 1100 (i.e., going to the online stores 120). Shopping lists 1100 are shown in more detail in FIG. 11. Also, responses 106 received by the users 101 can be virtual wish lists 900 (coming from the virtual wish list providers 130) or recommended product lists 1200 (coming from the online stores 120).

Figure 4:
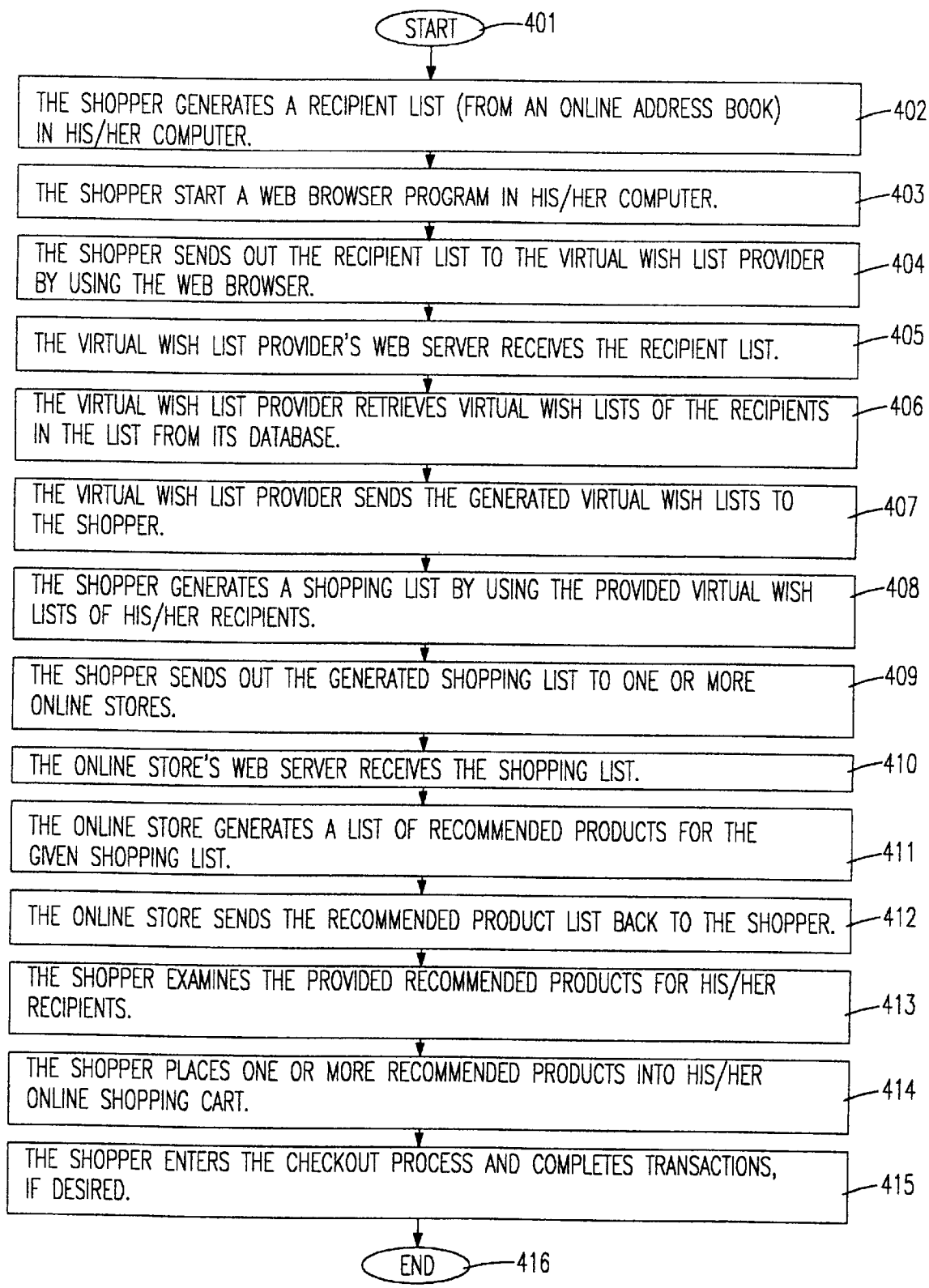
FIG. 4 is a flow chart of another preferred business process for using virtual wish lists.

FIG. 4 is a flow chart of another preferred business process for using virtual wish lists. This flow chart describes the business process happening the system architecture given in FIG. 3. The first two steps 402 and 403 are the same as steps 202 and 203 of FIG. 2. After a recipient list 702 is ready, the user 101 sends it out to one or more virtual wish list providers 130 by using the Web browser program 103 and the network in step 404. When a virtual wish List provider 130 receives a recipient list in step 405, it retrieves and/or searches one or more virtual wish lists 900 for each recipient 140 from its database in step 406. The details of this retrieval and/or search step 406 is similar to those of the corresponding step 210 in FIG. 2. For reasons of privacy, the user 101 may need to obtain an approval from his or her recipients 140 for accessing their virtual wish lists through the providers 130. The recipients 140 also need to notify the virtual wish list providers 130 about their approval for the users accessing virtual wish lists. The virtual wish list providers 130 sends the prepared virtual wish lists 900 of the recipients 140 in the recipient list 702 back to the user 101 who requested them in step 407.

When the user 101 receives the virtual wish lists 900 from all the providers which he or she sent out his or her requests to, the user may need to merge them together for a review, manually or by using a computer program. The user 101 examines the virtual wish lists of recipients in his or her recipient lists, understands their needs and tastes, and creates a shopping list 1100 which may include one or more constraints in various terms: the user's budget, the product price, the attributes of products such as color, size and brand, the product categories, and the relationship among products and their attributes in step 408. This shopping list 1100 is sent to one or more online stores in step 409 and will be input to one or more product list generator program 122 of the online stores in a later step.

When an online store 120 receives a shopping list 1100 from the user 101 by using the Web server program 121 and the network in step 410, it passes it to the product list generator program 122 which creates a list of recommended products 1200 for the given shopping list in step 411. The details of the product list generation is presented and claimed in U.S. patent application Ser. No. 09/617,496 entitled "Electronic Shopping Assistant". The online store 120 sends the recommended product list 1200 it generated back to the user 101.

When the user 101 receives the recommended product lists 1200 from all the online stores 120 he or she sent his or her shopping list 1100 to, the user 101 can examine the recommended products for his or her recipients in step 413. If desired, the user 101 can tag one or more recommended products in the list 1200 and request a new set of product recommendation by sending the tagged list to one or more online stores 120. When satisfied with the provided recommended products, the user 101 places one or more recommended products into his or her online shopping cart in step 414. Finally, the user 101 enters the check-out process and completes transactions, if desired in step 415. The details of the last two steps 414 and 415 are similar to those of the process described in FIG. 2, and are not repeated here.

Figure 5:
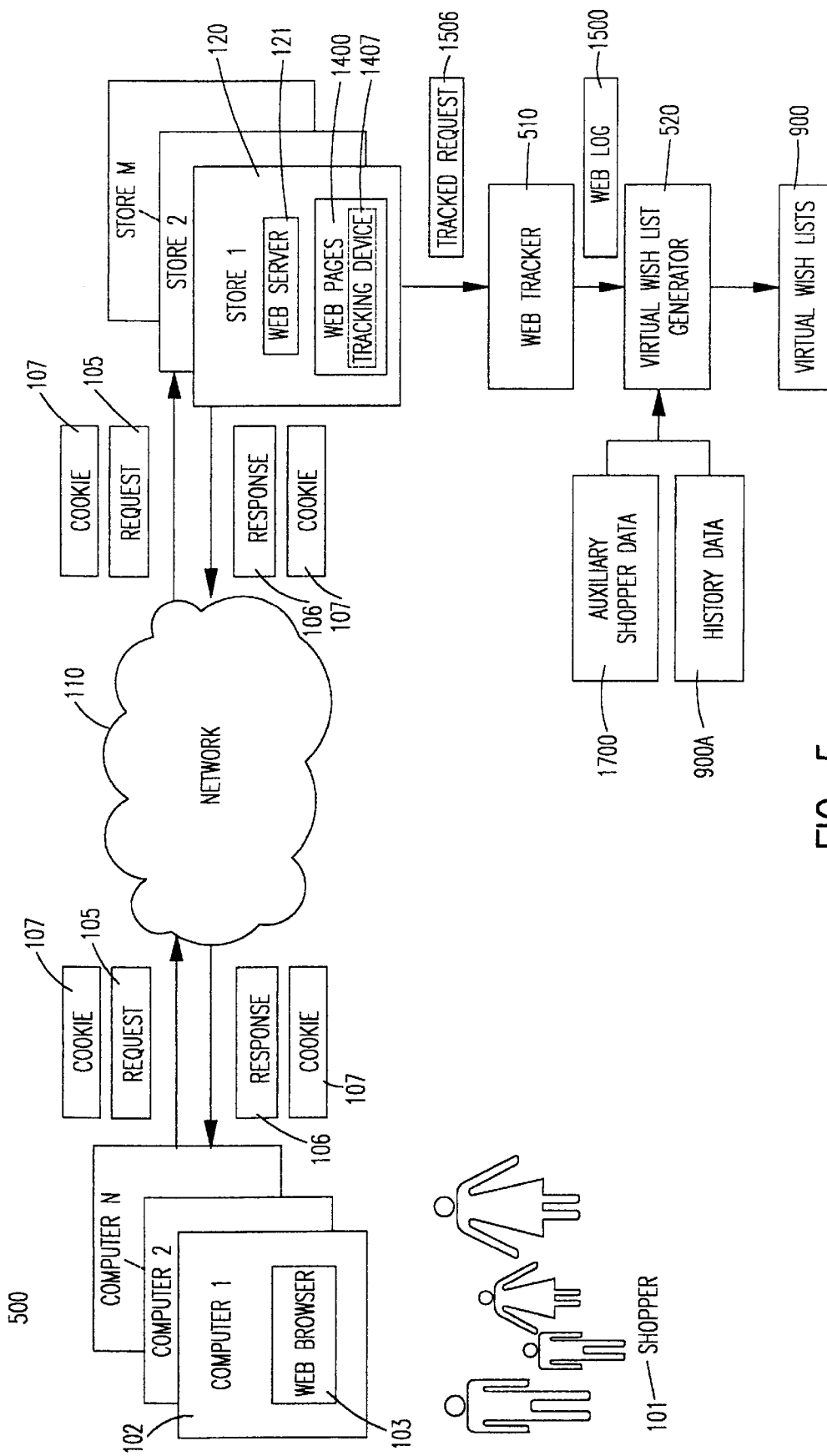
FIG. 5 is a block diagram of one preferred system architecture for generating virtual wish lists.

FIG. 5 is a block diagram of one preferred system architecture for generating virtual wish lists showing one or more shoppers 101, one or more computers 102 used by the shoppers, one or more Web browser programs 103 used by the shoppers, one or more requests 105 from the shoppers, one or more responses 106 to the shoppers, one or more cookies 107, computer network 110, one or more online stores 120 in the network, one or more Web server programs 121 used by the online stores, one or more Web pages 1400 (shown in more detail in FIG. 14), one or more tracking devices 1406 embedded in the Web pages, one or more tracked requests 1506, a Web tracker 510, one or more Web log files 1500 (shown in more detail in FIG. 15), a virtual wish list generator 520, a set of auxiliary shopper data 1700, a set of history data 900A, and one or more virtual wish lists 900.

Shoppers 101 visit online stores 120 in the network 110 to purchase and/or obtain information of products sold in the stores. To access information from online stores 120, shoppers 101 use Web browser programs 103 in their computers 102 and make requests 105 for one or more Web pages 1400. Online stores 120 use Web server programs 121 to send back responses 106 to the shoppers 101 in the form of Web pages 1400 describing one or more products and/or giving one or more links to Web pages supporting commerce activities such as online shopping carts and check-out pages. Web page requests 105 made by shoppers 101 to online stores 120 can be recorded in one or more of Web log files 1500 by using tracking devices 1406 embedded in Web pages. These tracking devices 1406 are a small computer program that is embedded in a Web page and invoked when the Web page is requested to record relevant information about the request 1506 in the Web log 1500.

Those Web page requests 1506 recorded in Web logs 1500 can be grouped by shopper and by session which is defined as a series of Web pages requested by a shopper in a single visit. This grouping of Web page requests 1506 can be done in an accurate and reliable manner if the requests are recorded with a certain shopper identification information such as cookie 107. A cookie is a piece of information shared between a shopper's Web browser program 103 and a Web server program 121, in this case, the Web tracker 510, originating as a message by a Web server program 121 to the Web browser program 103 visiting the server's Web site 120, subsequently stored in a text file on the hard drive of the shopper's computer 102, and sent back to the server 121 each time the Web browser 103 requests a Web page 1400 from the server 121. The cookies 107 help identify shoppers 101 because their values are unique for each Web browser 103.

Virtual wish list generator 520 periodically (for example, once a day) receives Web logs 1500 as input where Web page requests 1506 are grouped by session and by shopper. It combines this input data with other auxiliary shopper data 1700 (shown in more detail in FIG. 17) such as demographic data, creates and/or updates virtual wish lists 900 of the shoppers, and stores them in a database system for the use by one or more virtual wish list providers 130. When a virtual wish list is first created for a shopper, the virtual wish list generator 520 and/or the virtual wish list provider 130 ask the shopper for an approval of using his or her virtual wish list for product recommendations. The shopper may approve or disapprove the use. The shopper can disapprove the use of the virtual wish list for various reasons including a privacy one. If the shopper approves the use of the virtual wish list, he or she becomes the owner of the list, and allows selectively other shoppers and online stores to use it.

Figure 6:
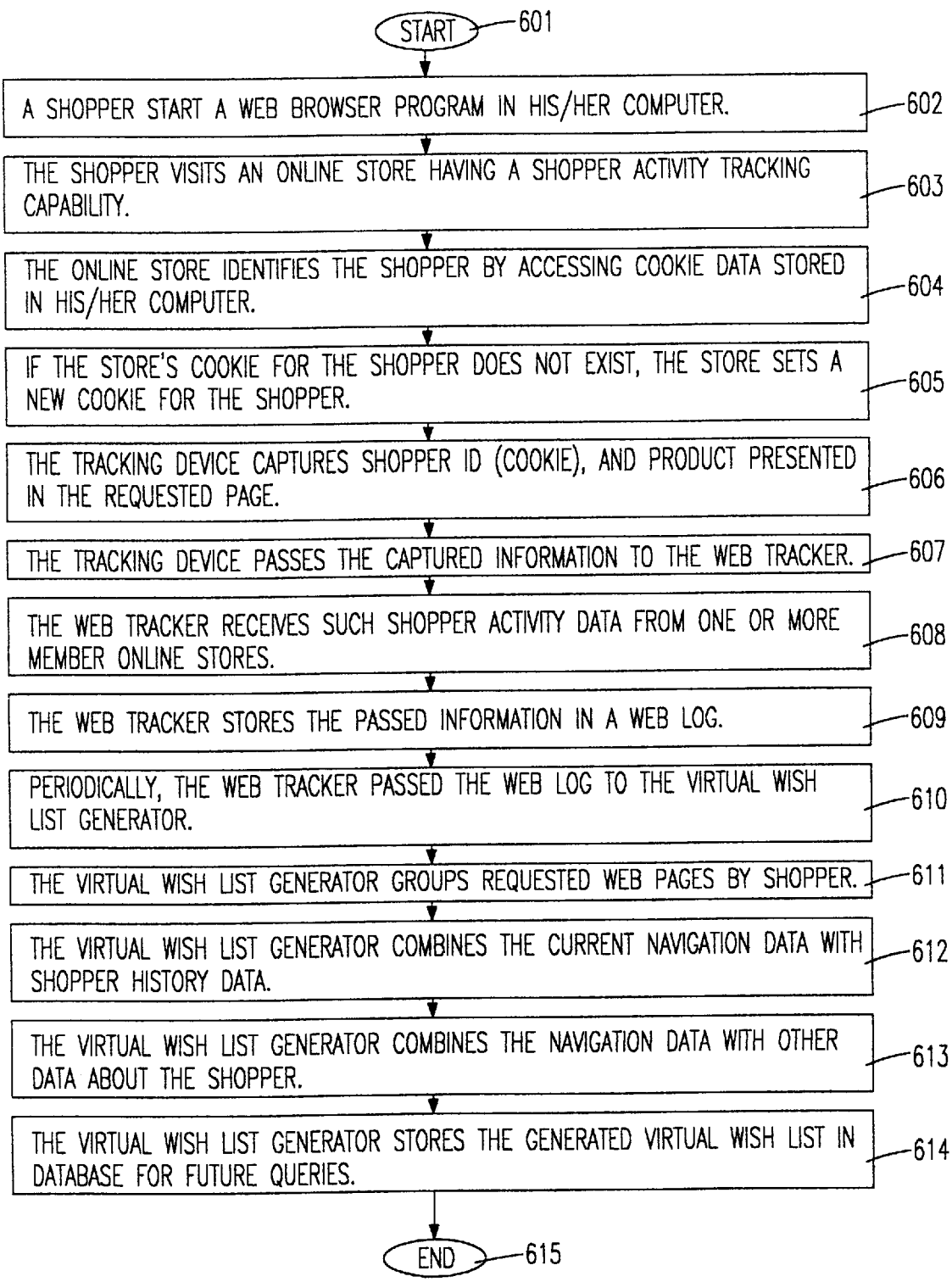
FIG. 6 is a flow chart of a preferred business process for generating virtual wish lists.

FIG. 6 is a flow chart of a preferred business process for generating virtual wish lists. First, a shopper 101 starts a Web browser program 103 in his or her computer in step 602, and visits one or more online stores 120 in the network in step 603. We assume that the online stores 120 the shopper 101 visits have a capability of tracking shopper navigation at Web sites, for example, by embedding tracking devices 1406 in their Web pages 1400. The online store 120 visited by the shopper 101 identifies the shopper by using cookie data 107 stored in the shopper's computer in step 604. If the store's cookie does not exist in the shopper's computer 102, the store's Web server program 121 sets a new cookie for the shopper. Namely, it sends out a new cookie string to the shopper's Web browser 103 which stores the value in the shopper's computer 102 for later communications between the browser 103 and the server 121.

For each Web page request 105 from the shopper 101, the tracking device 1406 embedded in the requested Web page 1400 is invoked and capture such information as the shopper's identification or ID (i.e., the shopper's cookie), the products, if any, presented in the Web page, and the store presenting the Web page, and the time stamp in step 606. The information captured by the tracking device 1406 is passed to the Web tracker in the form of a tracked request in step 607, and stored in the Web log in step 609. The Web tracker 510 receives one or more tracked requests 1506 from one or more online stores which have a capability of tracking shopper navigation at Web sites in step 608. In real-time or periodically (for example, once a day), the data stored in the Web log 1500 is passed to the virtual wish list generator 520 which creates and/or updates the virtual wish lists 900 of shoppers 101 whose Web page requests 105 are captured in the Web log 610.

The virtual wish list generator 520 first groups Web page requests 1506 stored in the Web log 1500 by shopper and session in step 611. Then it combines the current navigation data, i.e., Web page requests in the current Web log 1500 with historical navigation data 900A of each shopper found in the current Web log in step 612. Then, the virtual wish list generator 520 combines the navigation data with other data about the found shoppers, if necessary and/or available in step 613. Finally, it stores the created virtual wish lists 900 in database for future use by one or more virtual wish list providers 130 in step 614.

Figure 7:
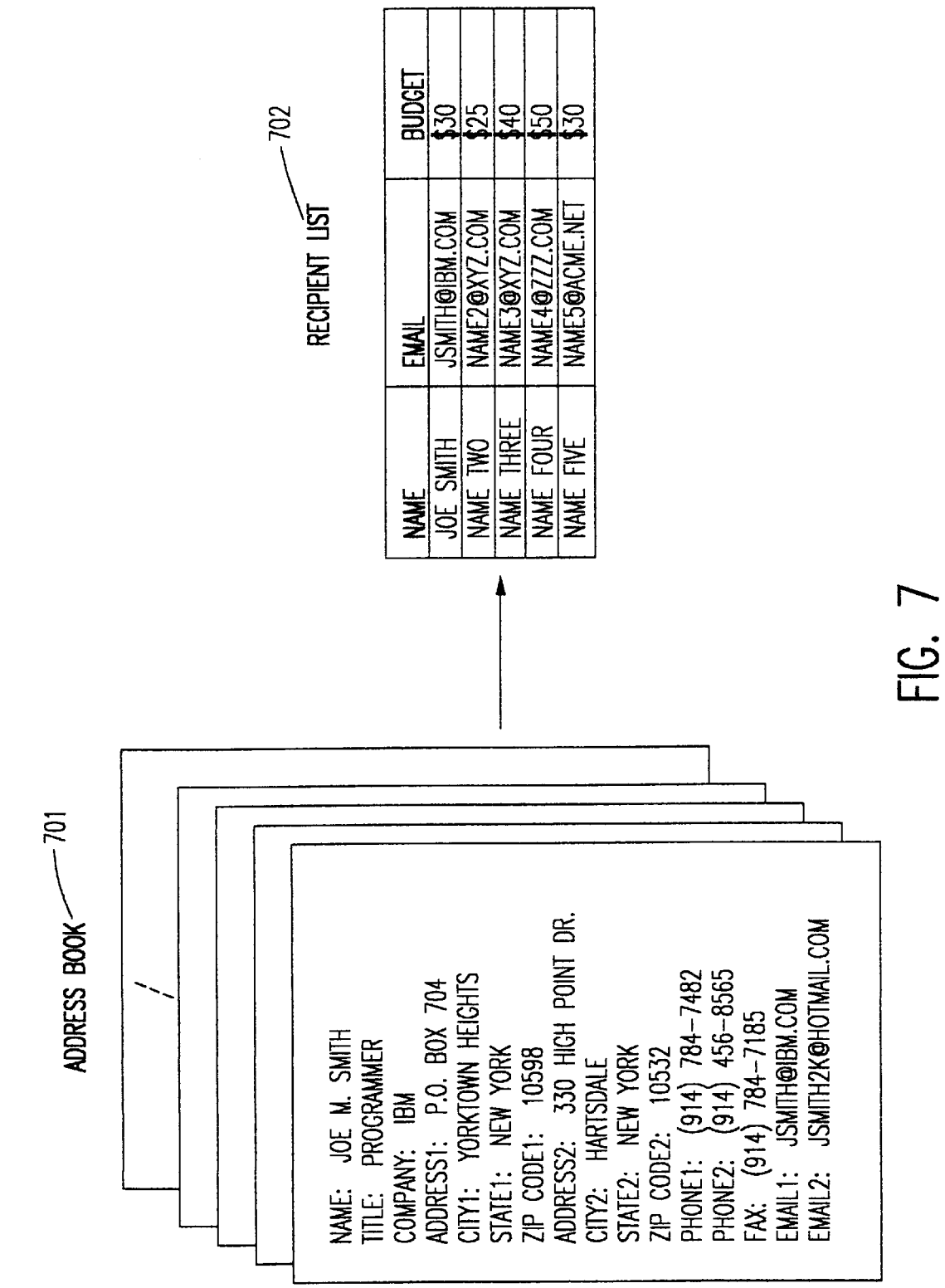
FIG. 7 is a block diagram showing an online address book and a recipient list.

FIG. 7 is a block diagram showing an online address book and a recipient list 700. An online address book 701 is a computer program that helps the user store and manage information about people they need to communicate with. While the type of data can vary from one address book to another, most of them allows to store, as shown in this figure, one or more of names, titles, affiliations, post-mail addresses, phone numbers, fax numbers, and e-mail addresses. When a shopper 101 wants to purchase products for one or more of other people, he or she can use one or more address books to prepare the list of recipients of products 702. The recipient list needs to include certain recipient identification information such as name and e-mail address. E-mail addresses are particularly useful (as compared with post-mail addresses for identifying people among Web sites in the network 110. Other identification information include cookie data, user codes and passwords, and social security numbers which are harder to use for this purpose for privacy reasons. The recipient list 702 may include one or more constraints for shopping. This figure shows one example constraint which is a price limit for each product recipient.

Figure 8:
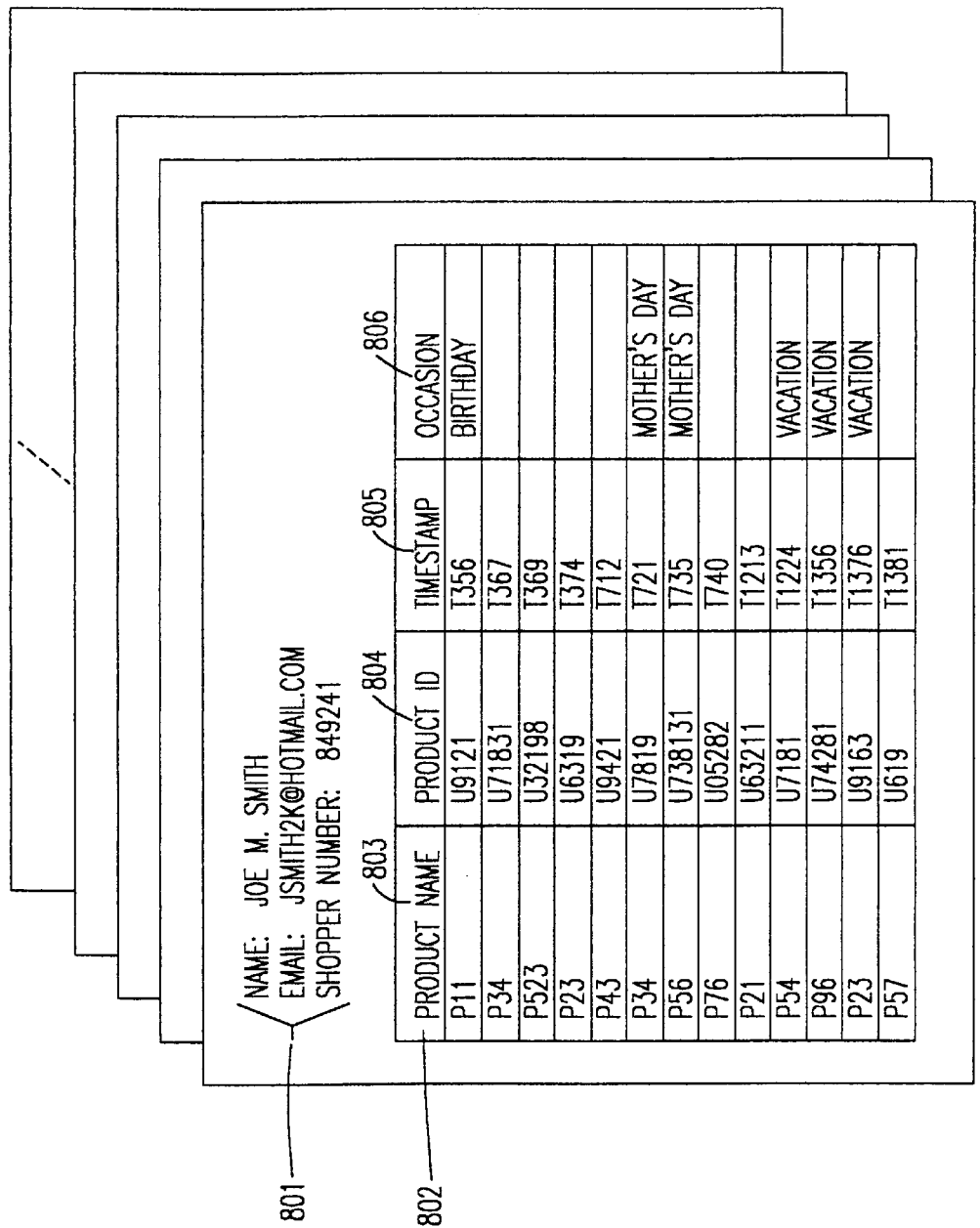
FIG. 8 is a block diagram showing actual wish lists of an online store.

FIG. 8 is a block diagram showing actual wish lists 800 of an online store. A wish list is a shopping tool available in a number of online stores. A shopper 101 can create a wish list in an online store 120 and record information on products he or she wants to buy from the store in the list. The store 120 keeps the product information for a definite period of time, e.g., a year. The shopper 101 or people who obtained an approval from the shopper can access the list anytime and make one or more transactions for purchasing one or more products stored in the List. Some online stores extend their shopping cart service to provide the wish list capability to some degree. However, such shopping carts stores the product information for a shorter period of time, e.g., ninety days. A wish list helps its users purchase a product bundle at one time from an online store. It is different from the present invention because it requires the users to choose one or more products to buy. A wish list typically comprises the shopper identification information 801 and product entries 802. The shopper identification information 801 includes name, e-mail address, and shopper number in this online store, among others. Each product entry 802 includes the product name 803, the product ID 804 (in case that the product name is not sufficient to identify products), the time stamp 805 indicating when this product entry was made, and the occasion 806 related to this product purchase, if any.

Figure 9:
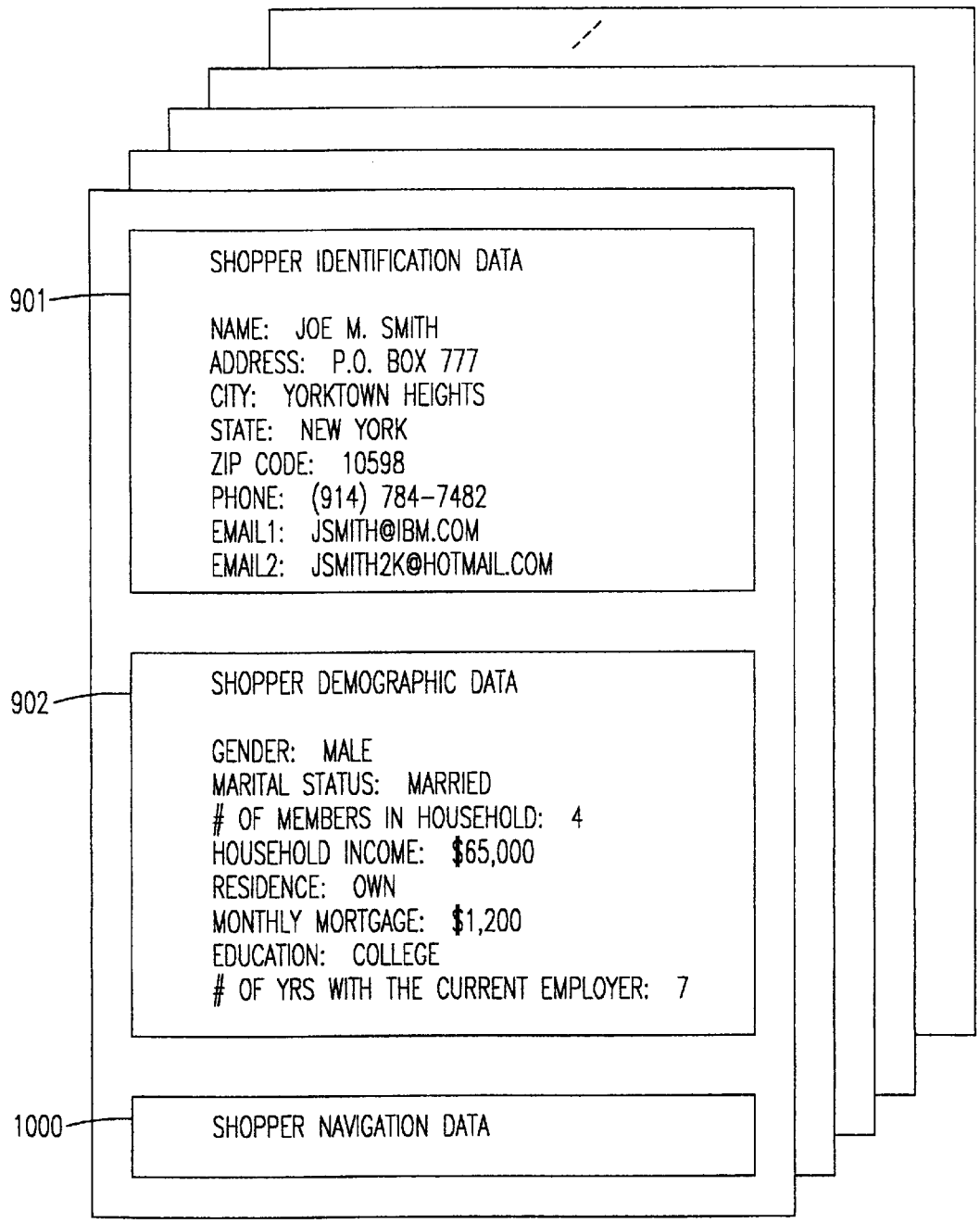
FIG. 9 is a block diagram showing virtual wish lists.

FIG. 9 is a block diagram-showing virtual wish lists 900 which are created by the virtual wish list generator 520 and used by the virtual wish list providers 130 for making relevant product recommendations when a shopper purchases products for other people. A virtual wish list includes the following three types of information about its owner: the shopper identification data 901, the shopper demographic data 902, and the shopper navigation data 1000. The shopper identification data 901 contains such data as the owner's name, the post-mail address, the phone number and the e-mail address. The shopper demographic data 902 contains such data as the gender, the marital status, the number of members in the household, the household income, the education level, and so on, if available. The shopper navigation data 1000 is described in detail in FIG. 10.

FIG. 10 is a block diagram showing shopper navigation data which is part of virtual wish lists 900 providing information about products the owner of the virtual wish list is interested in based on his or her visits to the products' Web pages. An entry is given for each product whose Web page the shopper visited one or more times, and provides the name of product 1001, the product ID 1002, the name of the store presenting the product to the shopper 1003, the time stamp of the shopper's first visit 1004, the time stamp of the shopper's last visit 1005, the total number of the visits of the shopper to the product's Web page 1006, and the interest level 1007. This information is useful to make relevant product recommendations.

In particular, the last field, the interest level 1007, shows how much the shopper is interested in this product in a number, for example, "1" meaning low, "2" medium, and "3" high. The interest level 1007 can be calculated in many different ways. Examples of factors that are taken into account for the calculation include frequency and recency of visits, and how closely the shopper went to the purchase of the product. A shopper goes through a number of steps before purchasing a product in an online store. First, the shopper sees a hyperlink to the Web page of the product. Second, he or she clicks on the hyperlink and examines the Web page presenting the product. Third, he or she places one or more units of the product in his or her online shopping cart. Finally, he or she enters the check-out process and completes the purchase of the product. If a shopper places an item of product A into his or her cart, while he or she only views the Web page of product B, it is believed that the shopper is more interested in product A than product B. It is expected that the interest level of product A is higher than that of product B for this shopper in the shopper navigation data section of the virtual wish list.

FIG. 11 is a block diagram showing a shopping list 1100 (FIG. 3) which is created by a shopper 101 and provided as input to one or more product list generators 122 of online stores 120. In FIG. 3, it is assumed that a shopper can refer to virtual wish lists 900 of his or her recipients 140 to create a shopping list 1100. Therefore, a shopping list can include for each entry a recipient field 1101 and a number of fields giving product information 1103 (the product name 1107, the product ID 1108, and the interest level 1109) from the virtual wish list 900. Also, a shopping list 1100 may include one or more constraints 1102 in various terms: the user's budget 1104, the product price, the attributes of products such as color 1105, size 1106 and brand, the product categories, and the relationship among products and their attributes 408.

FIG. 12 is a block diagram showing a recommended product list 1200 which a product list generator 122 of an online store 120 creates for a shopping list 1100 given as input. Basically, each entry of a product list 1200 corresponds to an entry in the given shopping list 1100, and gives more detail information of the product available in the store 120 such as price 1203, size 1204 and color 1205. The recipient field 1201 and product fields (e.g., product name 1206, product ID 1207, and interest level 1208) are inherited from the shopping list 1100. Sometimes it is possible that certain products suggested in the shopping list (which uses the information from virtual wish lists) are not available in the store 120 where the shopping list 1100 is submitted. Then the store 120 may not be able to have entries for such products in the recommended product list 1200.

Alternatively, the store 120 may recommend a substitution product 1210 which functions in a similar way as the original product. Also, the store 120 may include certain accessory products 1211 or up-sell products in the product list 1200 though they are not included in the given shopping list 1100. To suggest substitution, accessory, cross-sell, up-sell, and promotion products, online stores 120 use merchandising data table shown in FIG. 13.

FIG. 13 is a block diagram showing merchandising data which is used by a product list generator 122 of an online store 120 to suggest products that are not included in the given shopping lists 1100, but help make the recommended product list more useful and improve the revenue of the store 120. Each entry of the merchandising data table includes for each product the product name 1301, the product ID 1302, the cross-sell products 1303, the up-sell products 1304, the accessory products 1305, the substitution products 1306, the indicator of promotion 1307, and the inventory level 1308. The inventory level 1308 can be represented in numbers, for example, "1" meaning high, "2" medium, and "3" low.

Figure 14:
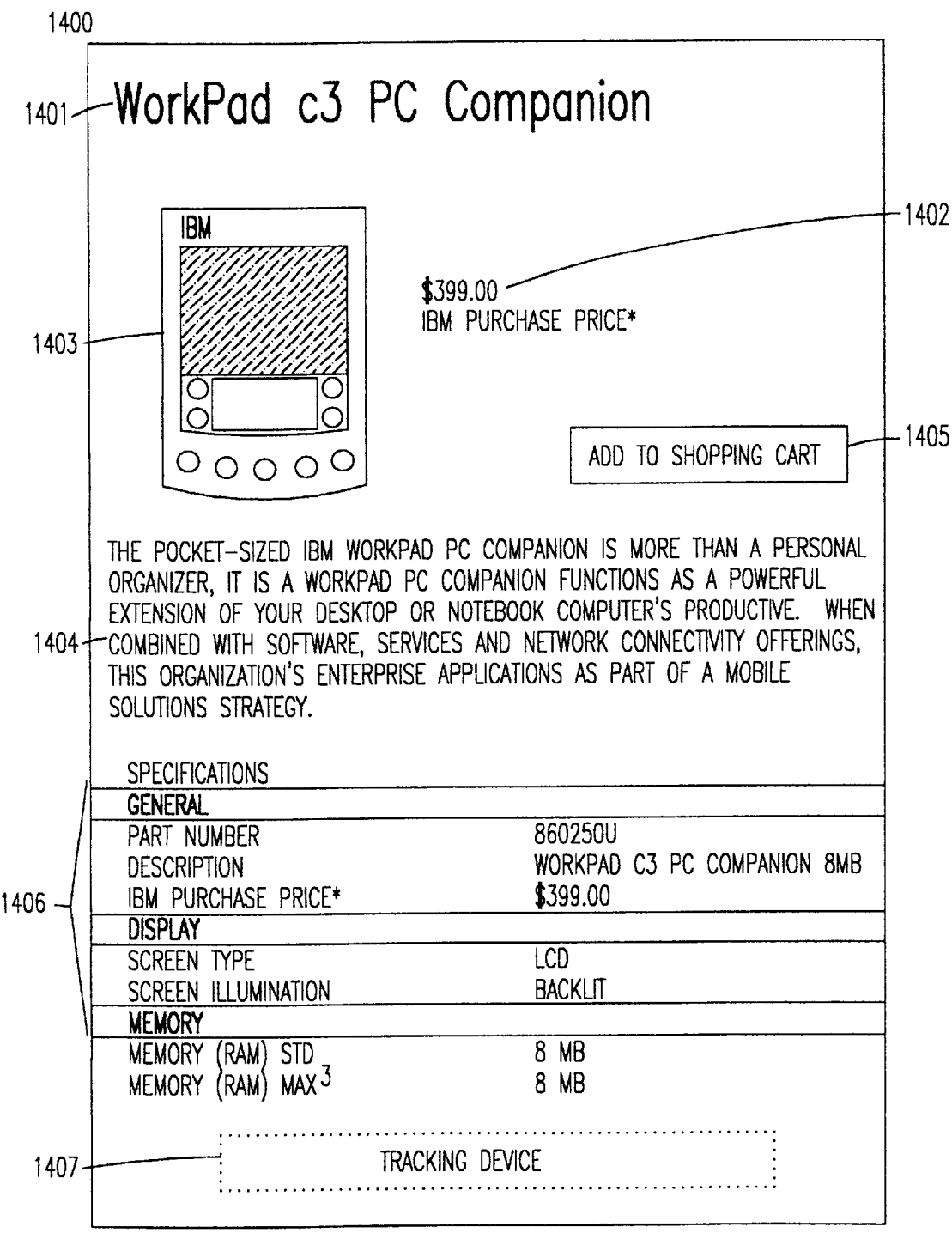
FIG. 14 is a block diagram showing a product Web page embedding a tracking device.

FIG. 14 is a block diagram showing a product Web page 1400 (FIG. 5) embedding a tracking device. The product Web page provides various information about one or more products including the product name 1401, the price 1402, an image of the product 1403, a short description 1404, a button to add the product to an online shopping cart 1405, and a detail product specification 1406. A tracking device is a small computer program that is embedded in product Web pages. It is invisible to shoppers 101. It is invoked each time the Web page is requested by a shopper 101, captures information about the shopper and the product(s) presented in the Web page, and passes the captured information to the Web tracker 510 which stores the information in the Web log).

FIG. 15 is a block diagram showing a Web log 1500 (FIG. 5) which stores the information about Web page requests 1506 by shoppers. Web logs 1500 are created and managed by the Web tracker 510 which receives one or more tracked Web page requests 1506 from one or more online stores 120, stores them in Web logs 1500, and passes the Web logs to the virtual wish list generator 520 periodically (e.g., once a day) or in real time. Each entry in a Web log 1500 is a tracked Web page request 1506 which include the cookie 107 and 1501 identifying the shopper who makes the request 105, the product name 1502, the product ID 1503, the store presenting the Web page 1504, and the time stamp for the request 1505. The entries in a Web log 1500 are typically ordered by time stamp, and so requests from different shoppers 101 and from different online stores 120 are interleaved.

FIG. 16 is a block diagram showing a Web log grouped by shopper. Web page requests recorded in a Web log 1500 can be grouped by shopper and by session. FIG. 16 shows an example. The first table 1601 presents Web page requests made by a shopper who is identified by the cookie value, C1, the second 1602 presents Web page requests by a shopper who is identified by the cookie value, C2, and so on. Entries in these session tables are the same as the ones in the Web log 1500.

Figure 17:
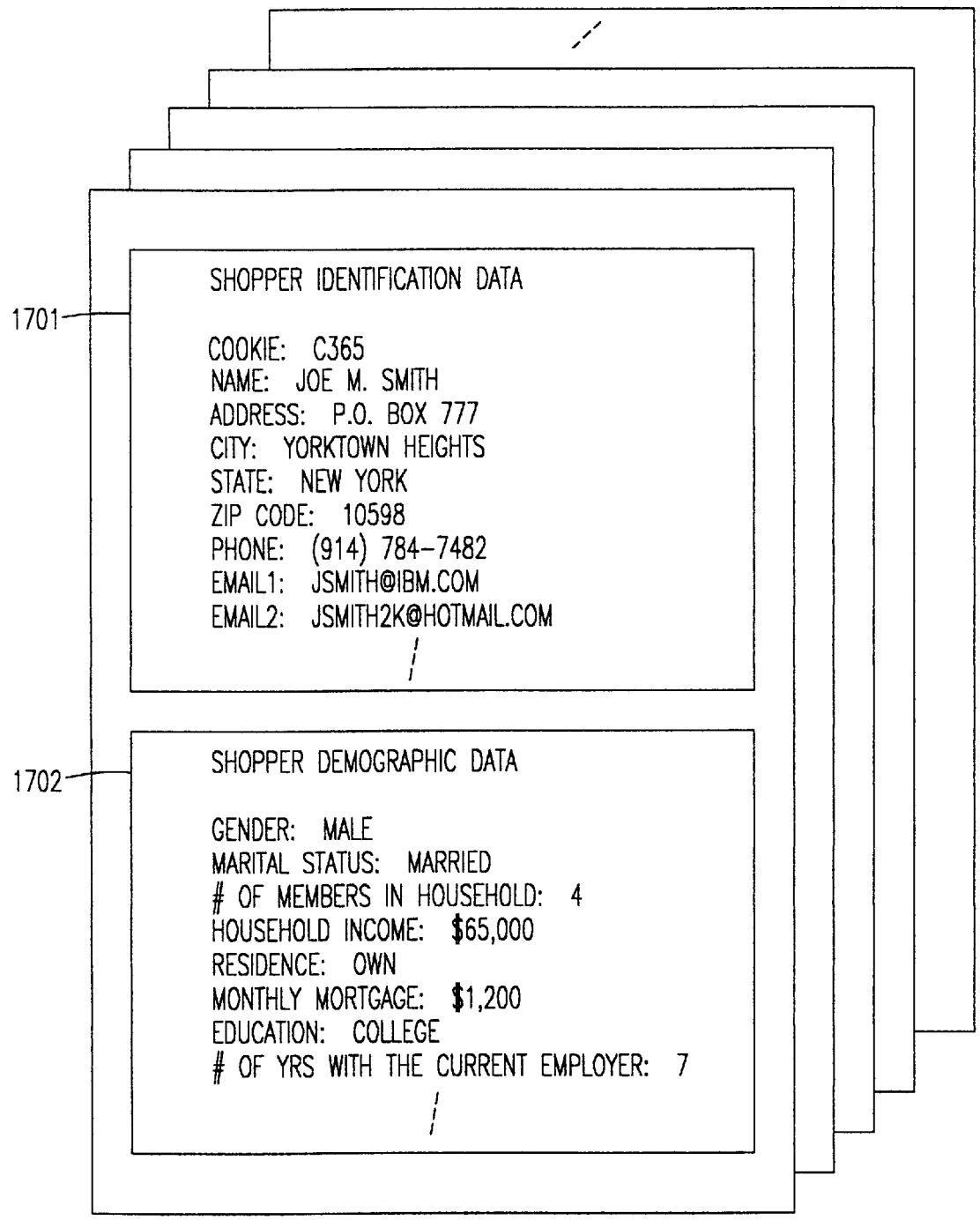
FIG. 17 is a block diagram showing auxiliary shopper data.

FIG. 17 is a block diagram showing auxiliary shopper data 1700 (FIG. 5) which is integrated with shopper navigation data presented in FIG. 16 by the virtual wish list generator 520 to create virtual wish lists 900. The virtual wish list generator 520 uses a key common to the shopper navigation data 1600 and auxiliary shopper data 1700 such as cookie for the integration. The auxiliary shopper data may contain various types of data that are useful for making relevant product recommendations including shopper identification data and demographic data.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A computer system for using one or more virtual wish lists of one or more shoppers over one or more networks, the system comprising:
   one or more central processing units (CPUs), one or more memories, and one or more network interfaces to one or more networks;
   one or more recipient list generating processes that extract information about one or more people from one or more personal database systems, and create one or more lists of people for whom the shopper wants to purchase one or more products;
   one or more recipient list updating processes that receive one or more recipient lists from one or more shoppers, and modify them if necessary to reflect data stored in one or more actual wish lists, or to reflect merchandising efforts of one or more online stores;

one or more shopping list generating processes that receive one or more virtual wish lists of one or more product recipients, and create one or more shopping lists for the product recipients;

one or more virtual wish list retrieval processes that receive one or more product recipient lists from one or more shoppers or one or more online stores, and retrieve and search for virtual wish lists for the product recipients from one or more databases;

one or more recommended product list generating processes that receive one or more recipient lists, one or more virtual wish lists, and one or more shopping lists from one or more shoppers, one or more online stores, and one or more virtual wish list retrieval processes, and create one or more recommended product lists, at least one of said virtual wish lists including product information from observation by said virtual wish list retrieval process of visits by one of said shoppers to a plurality of said online stores, said product information being obtained from visits wherein the shoppers do not register a product preference in a store's product registry;

one or more virtual list use approval request processes that ask a shopper for approval of the use of the shopper's virtual wish list by other shoppers, one or more online stores, and one or more other Web sites; and one or more virtual list use approval processes that allows the owner of a virtual wish list to modify the virtual wish list if necessary and to selectively approve the use of the virtual wish list by other shoppers, one or more online stores, and one or more other Web sites.

2. A computer system for using one or more virtual wish lists of one or more shoppers over one or more networks, as recited in claim 1, wherein the virtual wish list comprises a set of shopper identification data, a set of shopper demographic data, and a set of shopper navigation data.

3. A computer system for using one or more virtual wish lists of one or more shoppers over one or more networks, as recited in claim 2, wherein the shopper identification data include data selected from the group consisting of name, street address, city, state, zip code, country, phone number, e-mail address, social security number, driver's license number, store registration name, and store registration password.

4. A computer system for using one or more virtual wish lists of one or more shoppers over one or more networks, as recited in claim 2, wherein the shopper demographic data are selected from the group consisting of gender, marital status, number of member in household, household income, residence ownership, monthly rent or mortgage, education level, employer, number of years with the current employer, race, religion, computer ownership, Internet-accessibility, and online shopping experience.

5. A computer system for using one or more virtual wish lists of one or more shoppers over one or more networks, as recited in claim 1, wherein said observation by said virtual wish list retrieval process comprises product identity, store identity, a time of the first visit to a Web page presenting the product, a time of a most recent visit to the Web page presenting the product, a total number of visits to the Web page presenting the product, and an interest level.

6. A computer system for using one or more virtual wish lists of one or more shoppers over one or more networks, as recited in claim 5, wherein the interest level of a shopper for a product is calculated by taking into account factors selected from the group consisting of a time of a first visit to the Web page presenting the product, a time of a most recent visit to the Web page presenting the product, a total number of visits to the Web page product, and which shopping steps the shopper reached for the product.

7. A computer system for using one or more virtual wish lists of one or more shoppers over one or more networks, as recited in claim 6, wherein the shopping steps of a product in one or more online stores comprise an impression of the product where the shopper sees a link to a product Web page, a click through where the shopper clicks on the link and examines the product Web page, a shopping cart placement where the shopper inserts one or more units of the product into the shopper's online shopping cart, and a purchase step where the shopper completes one or more transactions for purchasing the product.

8. A computer system for using one or more virtual wish lists of one or more shoppers over one or more networks, as recited in claim 1, wherein the online address book of a shopper comprises one or more address records for one or more people, each address record including any one or more of the following the person's name, title, affiliation, street address, city, state, zip code, state, country, phone number, and e-mail address.

9. A computer system for using one or more virtual wish lists of one or more shoppers over one or more networks, as recited in claim 1, wherein the recipient list of a shopper is a list of people for whom the shopper wants to purchase one or more products, and comprises recipients' identification information including their name and addresses and one or more shopping constraints.

10. A computer system for using one or more virtual wish lists of one or more shoppers over one or more networks, as recited in claim 1, wherein an actual wish list of a shopper comprises a shopper's identification information including one or more of the shopper's name, addresses, user name and password, and one or more records of products of interest, each record specifying a product with its identity, the time when the record was created, the occasion for the purchase of this product, if any, and one or more attributes of this product including price, size, color and brand.

11. A computer system for using one or more virtual wish lists of one or more shoppers over one or more networks, as recited in claim 1, wherein a merchandising effort of an online store includes cross-selling which markets one or more products complementary in function to a selected product, up-selling which markets one or more products similar but more upscale than a selected product, accessory-selling which markets one or more products accessorizing a selected product, substitution which markets one or more products substituting a selected product, and promotion which markets one or more products for liquidation or testing.

12. A computer system for using one or more virtual wish lists of one or more shoppers over one or more networks, as recited in claim 1, wherein the shopping list of a shopper comprises a set of recipient identification data including a recipient's name and addresses, a set of product data including the product identity and the interest level of the recipient in the product, and a set of shopping constraints.

13. A computer system for using one or more virtual wish lists of one or more shoppers over one or more networks, as recited in claims 12, wherein shopping constraints in a shopping list are selected from the group consisting of a budget constraint that limits a price of individual products and a total price of all selected products, a product constraint that limits a number, preferences and kinds of selected products, and an inter-product constraint that limits differences in prices and kinds among selected products.

14. A computer system for using one or more virtual wish lists of one or more shoppers over one or more networks, as recited in claim 1, wherein the recommended product list comprises a set of recipient identification data including the recipient's name and addresses, and a set of attributes of recommended products including product identity, an interest level of the recipient in the product as specified in the corresponding shopping list, product price, size, color, brand, and other attributes.

15. A method for using virtual wish lists over a computer network comprising the steps of:

creating one or more recipient lists from one or more personal databases;

sending one or more recipient lists to one or more online stores or other Web sites over one or more computer network interfaces;

updating one or more recipient lists if necessary to reflect data stored in one or more actual wish lists or to reflect the merchandising efforts of one or more online stores;

asking one or more owners of virtual wish lists if they approve the use of their virtual wish lists by one or more other shoppers, online stores, and other Web sites;

receiving one or more approvals and disapprovals from the virtual wish lists owners on the use of their virtual wish lists;

retrieving and/or searching for virtual wish lists for one or more recipients specified in one or more recipient lists;

creating one or more shopping lists by merging one or more recipient lists and one or more virtual wish lists retrieved for the recipient lists, at least one of said virtual wish lists including product information from observation in said virtual wish list retrieval step of visits by one of said shoppers to a plurality of said online stores, said product information being obtained from visits wherein the shopper does not register a product preference in a store's product registry;

receiving one or more shopping lists over one or more computer network interfaces;

creating one or more lists of recommended products for one or more received shopping lists;

placing one or more recommended products into one or more online shopping carts; and completing one or more transactions for recommended products.

* * * * *